United States Patent
Hashimoto et al.

(10) Patent No.: US 10,284,060 B2
(45) Date of Patent: May 7, 2019

(54) STATOR ASSEMBLY METHOD AND STATOR ASSEMBLY APPARATUS

(71) Applicant: AISIN AW CO., LTD., Anjo-shi, Aichi-ken (JP)

(72) Inventors: Shingo Hashimoto, Okazaki (JP); Shingo Sato, Okazaki (JP); Shigeru Maeda, Toyota (JP); Masumi Tomura, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 167 days.

(21) Appl. No.: 15/300,002

(22) PCT Filed: Jun. 5, 2015

(86) PCT No.: PCT/JP2015/066403
§ 371 (c)(1),
(2) Date: Sep. 28, 2016

(87) PCT Pub. No.: WO2015/186835
PCT Pub. Date: Dec. 10, 2015

(65) Prior Publication Data
US 2017/0141659 A1    May 18, 2017

(30) Foreign Application Priority Data
Jun. 5, 2014    (JP) .................. 2014-117144

(51) Int. Cl.
*H02K 15/00*    (2006.01)
*H02K 15/14*    (2006.01)
(Continued)

(52) U.S. Cl.
CPC .......... *H02K 15/026* (2013.01); *H02K 1/146* (2013.01); *H02K 15/06* (2013.01); *H02K 15/062* (2013.01);
(Continued)

(58) Field of Classification Search
CPC ..... H02K 15/026; H02K 15/085; H02K 15/06
See application file for complete search history.

(56) References Cited

U.S. PATENT DOCUMENTS 4,543,708 A * 10/1985 Matsubara ............... H02K 3/12
29/598
5,350,960 A * 9/1994 Kiri .......................... H02K 1/16
310/194

(Continued)

FOREIGN PATENT DOCUMENTS

| EP | 2009768 A2 | 12/2008 |
| JP | S58-39251 A | 3/1983 |

(Continued)

OTHER PUBLICATIONS

May 19, 2017 Supplementary European Search Report issued in Patent Application No. 15803939.6.
(Continued)

*Primary Examiner* — Paul D Kim
(74) *Attorney, Agent, or Firm* — Oliff PLC

(57) ABSTRACT

A stator assembly method and stator assembly apparatus in which coils that have slot housed portions and coil ends formed from a conductor are mounted to an annular stator core that includes slots formed between adjacent teeth that extend from a back yoke toward an inner side in a radial direction.

22 Claims, 11 Drawing Sheets

(51) Int. Cl.
  *H02K 15/16* (2006.01)
  *H02K 15/02* (2006.01)
  *H02K 15/06* (2006.01)
  *H02K 15/085* (2006.01)
  *H02K 1/14* (2006.01)

(52) U.S. Cl.
  CPC ......... *H02K 15/066* (2013.01); *H02K 15/085* (2013.01)

(56) References Cited

U.S. PATENT DOCUMENTS

| | | | |
|---|---|---|---|
| 7,467,648 B2* | 12/2008 | Hashimoto | H02K 15/0435 140/71 C |
| 8,215,001 B2 | 7/2012 | Akimoto et al. | |
| 8,857,042 B2 | 10/2014 | Hasegawa et al. | |
| 2017/0141660 A1* | 5/2017 | Hashimoto | H02K 15/026 |

FOREIGN PATENT DOCUMENTS

| | | |
|---|---|---|
| JP | S60-74949 A | 4/1985 |
| JP | 2004-248434 A | 9/2004 |
| JP | 2008-104293 A | 5/2008 |
| JP | 2009-524392 A | 6/2009 |
| JP | 2009-195006 A | 8/2009 |
| JP | 2009-268158 A | 11/2009 |
| JP | 2011-193597 A | 9/2011 |
| JP | 2013-038898 A | 2/2013 |
| JP | 2014-007819 A | 1/2014 |
| JP | 2014-023183 A | 2/2014 |
| JP | 2014-064347 A | 4/2014 |
| KR | 10-2008-0089394 A | 10/2008 |

OTHER PUBLICATIONS

Aug. 18, 2015 International Search Report issued in Patent Application No. PCT/JP2015/066403.

* cited by examiner

FIRST EMBODIMENT

CIRCUMFERENTIAL DIRECTION

STATOR ASSEMBLY METHOD AND STATOR ASSEMBLY APPARATUS

BACKGROUND

The present disclosure relates to a stator assembly method and a stator assembly apparatus.

Hitherto, there has been known a stator manufacturing method that includes a step of inserting coils into slots of an annular stator core. Such a stator manufacturing method is disclosed in Japanese Patent Application Publication No. 2011-193597 (JP 2011-193597 A), for example.

In the stator manufacturing method described in JP 2011-193597 A, a jig that has a circular column shape and that has a plurality of holding grooves formed in the outer peripheral surface at the same pitch as that of the slots is prepared. A plurality of coils are inserted into the plurality of holding grooves of the jig. The coils are pushed out from the radially inner side toward the radially outer side with the jig disposed inside the stator core such that the holding grooves and the slots communicate with each other. Consequently, the coils are inserted into the slots while being guided by the holding grooves and teeth between the slots.

SUMMARY

In the stator manufacturing method according to JP 2011-193597 A, however, since the coils are inserted into the slots while being guided by the holding grooves and the teeth between the slots, the coils may be occasionally damaged due to contact between the coils and edge portions of the teeth that extend in the radial direction (corner portions of the teeth that extend in the radial direction).

The present disclosure has been made in view of addressing the foregoing issue, and therefore an exemplary aspect of the present disclosure provides a stator assembly method and a stator assembly apparatus that are capable of preventing coils from being damaged due to contact between the coils and edge portions of teeth that extend in the radial direction when inserting slot housed portions of the coils into slots.

In order to achieve the foregoing, a first exemplary aspect of the present disclosure provides a stator assembly method in which coils that have slot housed portions and coil ends formed from a conductor are mounted to an annular stator core that includes slots formed between adjacent teeth that extend from a back yoke toward an inner side in a radial direction, including: forming a coil assembly in which a plurality of the coils are disposed in an annular arrangement; and inserting the slot housed portions of the plurality of coils, which form the coil assembly disposed in a radially inner space of the stator core, into the slots of the stator core by pushing out the plurality of coils which form the coil assembly from a radially inner side toward a radially outer side while guide jigs are guiding the coils such that a separation interval between the coils and edge portions of the teeth that extend in the radial direction is kept in a course of the slot housed portions moving in the slots when inserting the coils into the slots of the stator core.

As described above, the stator assembly method according to the first aspect of the present disclosure includes inserting the slot housed portions of the plurality of coils, which form the coil assembly disposed in a radially inner space of the stator core, into the slots of the stator core by pushing out the plurality of coils which form the coil assembly from a radially inner side toward a radially outer side while guide jigs are guiding the coils such that a separation interval between the coils and edge portions of the teeth that extend in the radial direction is kept in a course of the slot housed portions moving in the slots when inserting the coils into the slots of the stator core. Consequently, the coils are prevented from contacting the edge portions of the teeth which extend in the radial direction when inserting the coils into the slots of the stator core. Thus, the coils are prevented from being damaged due to contact between the coils and the edge portions of the teeth which extend in the radial direction when inserting the slot housed portions of the coils into the slots of the stator core. The term "contact" covers a broad concept also including a state in which the coils receive a pressing force from the edges of the teeth via slot paper (insulating members, insulating paper) disposed (interposed) between the edge portions of the teeth and the coils. The phrase "a separation interval is kept" covers a broad concept also including a case where slot paper is present between the coils and the edge portions of the teeth.

A second exemplary aspect of the present disclosure provides a stator assembly apparatus that mounts coils that have slot housed portions and coil ends formed from a conductor to an annular stator core that includes slots formed between adjacent teeth that extend from a back yoke toward an inner side in a radial direction, including guide jigs, in which the guide jigs are configured to insert the slot housed portions of a plurality of the coils, which form the coil assembly disposed in a radially inner space of the stator core, into the slots of the stator core by pushing out the plurality of coils which form the coil assembly from a radially inner side toward a radially outer side while guiding the coils such that a separation interval between the coils and edge portions of the teeth that extend in the radial direction is kept in a course of the slot housed portions moving in the slots when inserting the coils into the slots of the stator core.

As described above, the stator assembly apparatus according to the second aspect of the present disclosure includes guide jigs that guide a plurality of the coils, which form the coil assembly disposed in a radially inner space of the stator core, such that a separation interval between the coils and edge portions of the teeth that extend in the radial direction is kept in a course of the slot housed portions moving in the slots when inserting the coils into the slots of the stator core. Consequently, the guide jigs prevent the coils from contacting the edge portions of the teeth which extend in the radial direction when inserting the coils into the slots of the stator core. Thus, it is possible to provide a stator assembly apparatus that can prevent the coils from being damaged due to contact between the coils and the edge portions of the teeth which extend in the radial direction when inserting the slot housed portions of the coils into the slots of the stator core.

With the present disclosure, as described above, it is possible to prevent the coils from being damaged due to contact between the coils and the edge portions of the teeth which extend in the radial direction when inserting the slot housed portions of the coils into the slots of the stator core.

DETAILED DESCRIPTION OF EMBODIMENTS

Embodiments of the present disclosure will be described below with reference to the drawings.

First Embodiment

Structure of Stator

Figure 1:
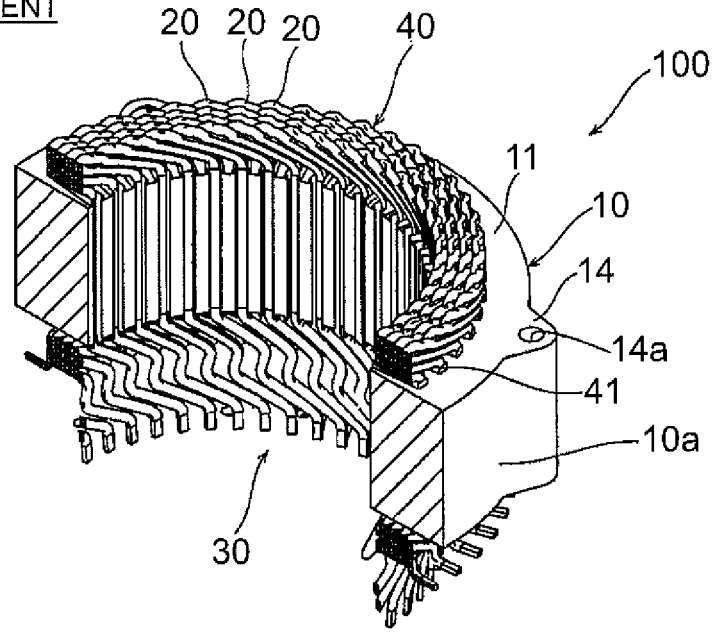
FIG. 1 is a perspective view of a stator according to a first embodiment of the present disclosure.
Figure 2:
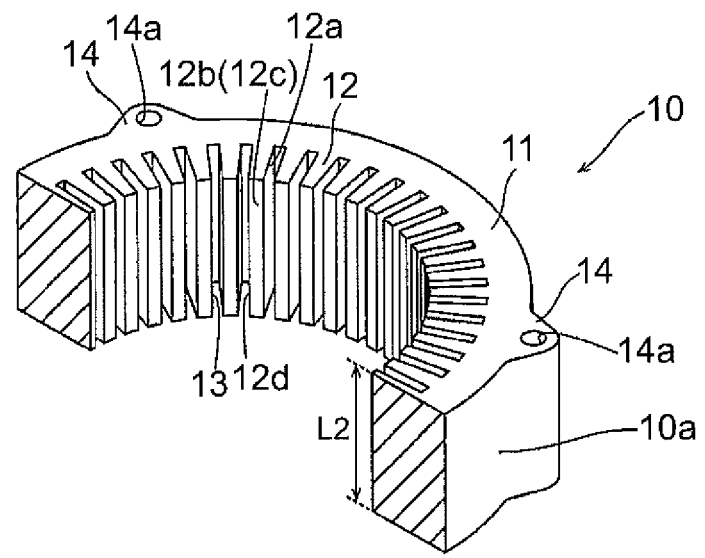
FIG. 2 is a perspective view of a stator core according to the first embodiment of the present disclosure.

The structure of a stator 100 according to a first embodiment will be described with reference to FIGS. 1 to 7. FIGS. 1 and 2 are each a sectional view of the stator 100 (stator core 10).

As illustrated in FIG. 1, the stator 100 includes a stator core 10 and coaxially wound coils 20. The stator 100 is configured to generate a magnetic field that rotates a rotor (not illustrated) when the coaxially wound coils 20 are energized. The coaxially wound coils 20 are an example of the "coils".

As illustrated in FIGS. 1 and 2, the stator core 10 is formed in an annular shape (hollow cylindrical shape). A radially inner space 30 configured to house the rotor is formed on the radially inner side (inner side in the radial direction) of the stator core 10. The stator core 10 is formed by stacking a plurality of magnetic steel sheets coated for insulation in the rotational axis direction, for example.

The stator core 10 includes a back yoke 11 formed in an annular shape, and a plurality of (e.g. 48) teeth 12 that extend from the back yoke 11 toward the inner side in the radial direction. The plurality of teeth 12 are provided to the stator core 10 at generally equal angular intervals in the circumferential direction. Slots 13 are formed between adjacent teeth 12.

The stator core 10 is provided with lug portions 14 configured to fix the stator 100 to a motor case (not illustrated). The lug portions 14 are formed to project outward from an end surface (outer peripheral surface 10a) of the stator core 10 on the outer side in the radial direction. A plurality of lug portions 14 are provided in the circumferential direction. For example, three lug portions 14 are provided at generally equal angular intervals. The lug portions 14 are each provided with a through hole 14a that penetrates the lug portion 14 in the rotational axis direction. Bolts (not illustrated) are fastened to the motor case via the through holes 14a of the lug portions 14 to fix the stator 100 to the motor case.

Figure 3:
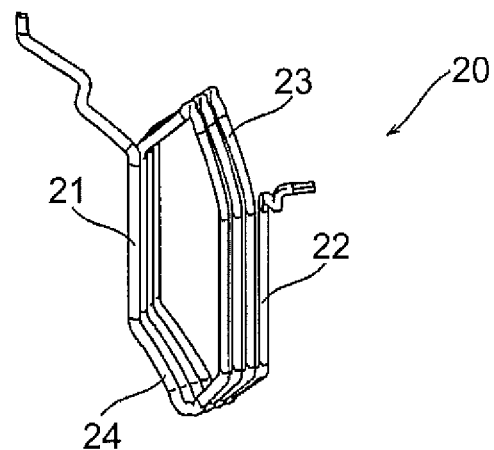
FIG. 3 is a perspective view of a coaxially wound coil according to the first embodiment of the present disclosure.

As illustrated in FIG. 3, the coaxially wound coils 20 are formed from a rectangular conductive wire with a generally rectangular shape in cross section. The rectangular conductive wire is formed from metal with high conductivity (e.g. copper or aluminum). The corner portions, in cross section, of the rectangular conductive wire may be chamfered (rounded) into a round shape. A plurality of (e.g. 48) coaxially wound coils 20 are disposed along the circumferential direction in the stator core 10. The rectangular conductive wire is an example of the "conductive wire".

The coaxially wound coils 20 are each a cassette coil formed by winding the rectangular conductive wire a plurality of times. The coaxially wound coils 20 are each formed by a winding forming device (not illustrated) by winding a single linear rectangular conductive wire a plurality of times, and thereafter by a shaping device (not illustrated) by shaping the winding into a predetermined shape (e.g. a generally hexagonal shape or a generally octagonal shape).

The coaxially wound coils 20 each include slot housed portions 21 and 22 and coil end portions 23 and 24 (i.e., coil ends). The slot housed portions 21 and 22 have a generally linear shape to be housed in the slots 13 of the stator core 10. The slot housed portion 21 and the slot housed portion 22 are housed in different slots 13 located at predetermined intervals in the circumferential direction of the stator core 10.

The coil end portions 23 and 24 are configured to project outward from end portions of the stator core 10 in the rotational axis direction, and to connect the slot housed portion 21 and the slot housed portion 22 to each other.

The coaxially wound coils 20 are each configured such that a plurality of rectangular conductive wires are stacked in the direction of the short sides of the cross section of the rectangular conductive wire. The plurality of stacked rectangular conductive wires are disposed (see FIG. 5) at predetermined intervals in the stacking direction (radial direction). The slot housed portions 21 and 22 are formed to be widened from the radially inner side toward the radially outer side such that the interval between the slot housed portion 21 and the slot housed portion 22 along the circumferential direction is varied in accordance with the stacking direction. This enables the coaxially wound coils 20 to be smoothly inserted into the slots 13. The coaxially wound coils 20 are mounted to the slots 13 such that the stacking direction of the rectangular conductive wires and the direction (radial direction) in which the slots 13 extend generally coincide with each other as seen in the rotational axis direction.

Figure 4:
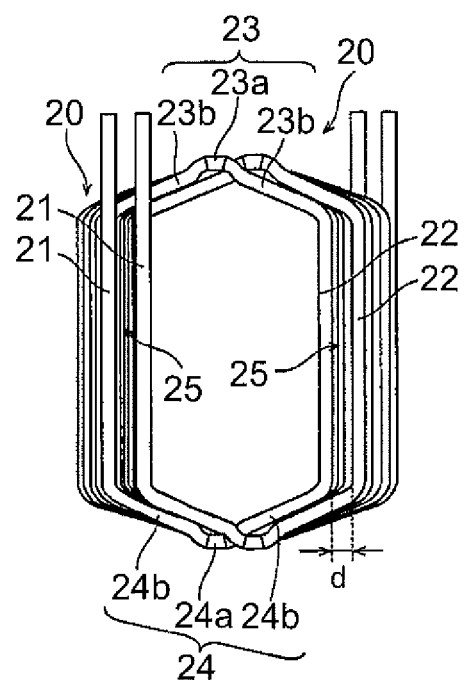
FIG. 4 is a perspective view of two coaxially wound coils disposed adjacent to each other according to the first embodiment of the present disclosure.
Figure 5:
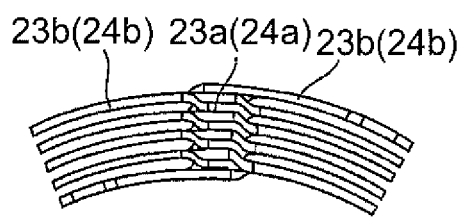
FIG. 5 illustrates the coaxially wound coil according to the first embodiment of the present disclosure as seen from above.

As illustrated in FIGS. 4 and 5, the coil end portions 23 and 24 include crank portions 23a and 24a formed in a crank shape by being bent in a staircase shape in the radial direction of the stator core 10, and curved portions 23b and 24b curved in an arc shape in accordance with the arc of the stator core 10 in an annular shape, respectively. The coaxially wound coils 20 are each formed by shaping the rectangular conductive wire edgewise (vertically winding the rectangular conductive wire with a short side of the rectangular conductive wire on the radially inner surface).

As illustrated in FIG. 1 (and FIG. 8 to be discussed later), a plurality of coaxially wound coils 20 are disposed in the circumferential direction to constitute a coil assembly 40. The coil assembly 40 has an annular cage shape. In the case where the stator 100 is applied to a three-phase AC motor, the coaxially wound coils 20 constitute any of a U-phase coil, a V-phase coil, and a W-phase coil.

As illustrated in FIG. 1 (and FIG. 9 to be discussed later), the stator 100 is provided with insulating members 41 disposed between the stator core 10 and the coaxially wound coils 20 to insulate the stator core 10 and the coaxially wound coils 20 from each other. The insulating members 41 each have a shape (generally U-shape as seen in the rotational axis direction) corresponding to the shape of the slot 13 of the stator core 10. The insulating members 41 are formed from paper or a resin (such as a thermosetting resin or a thermoplastic resin, for example). The insulating members 41 each have a thin film shape.

(Structure of Assembly Apparatus (Guide Jigs))

Next, an assembly apparatus 200 for the stator 100 according to the first embodiment will be described with reference to FIGS. 6 and 7. The assembly apparatus 200 includes guide jigs 50 that guide the slot housed portions 21 and 22 of the coaxially wound coils 20 into the slots 13, and a roller (not illustrated) that pushes out the coaxially wound coils 20 from the radially inner side toward the radially outer side.

Here, in the first embodiment, the guide jigs 50 (first guide jigs 51) are configured to guide a plurality of the coaxially wound coils 20, which form the coil assembly 40 disposed in the radially inner space 30 of the stator core 10, such that the separation interval (width W11 as seen in the axial direction; see FIG. 7) between the coaxially wound coils 20 and edge portions 12a of the teeth 12 that extend in the radial direction is kept in the course of the slot housed portions 21 and 22 moving in the slots 13 when inserting the coaxially wound coils 20 into the stator core 10. The guide jigs 50 are also configured to insert the slot housed portions 21 and 22 of the coaxially wound coils 20 into the slots 13 of the stator core 10 by pushing out the plurality of coaxially wound coils 20 which form the coil assembly 40 from the radially inner side toward the radially outer side. A specific description will be made below.

(Structure of First Guide Jigs)

Figure 6:
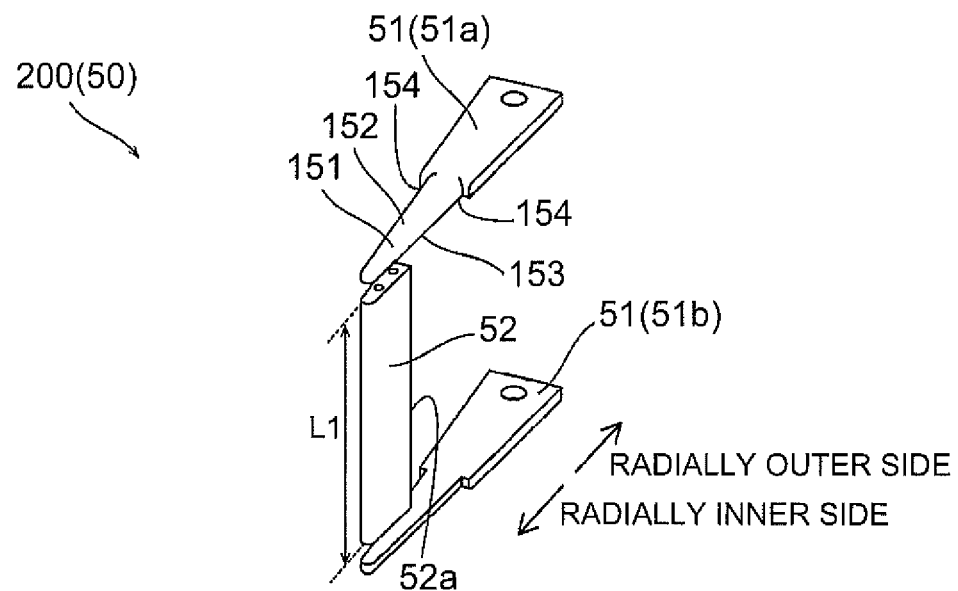
FIG. 6 is a perspective view of a guide jig according to the first embodiment of the present disclosure.

Here, in the first embodiment, as illustrated in FIG. 6, a width W1 (see FIG. 7) of the first guide jigs 51 (first guide jigs 51a and 51b) in the circumferential direction gradually becomes smaller from the radially outer side toward the radially inner side as seen in the rotational axis direction, and the first guide jigs 51 are disposed so as to overlap the teeth 12 when assembling the stator 100 (when inserting the coaxially wound coils 20 into the slots 13). The first guide jigs 51 are configured to be inserted into a space (tooth hole 25; see FIG. 4) between the slot housed portion 21 of one of adjacent coaxially wound coils 20 of the coil assembly 40 and the slot housed portion 21 of the other. The first guide jigs 51 have a function of guiding the slot housed portions 21 and 22 of the coaxially wound coils 20 into the slots 13, and suppressing slip-off of the insulating members 41 toward the outer side in the radial direction. The first guide jigs 51 (first guide jigs 51a and 51b) are an example of the "guide jigs".

The width (interval d between the slot housed portion 21 of one of adjacent coaxially wound coils 20 of the coil assembly 40 and the slot housed portion 21 of the other) of the tooth holes 25 (see FIG. 4) in the circumferential direction at each position in the radial direction is generally equal to the width W1 of the first guide jigs 51 in the circumferential direction at the same radial direction. This reduces deformation of the coaxially wound coils 20 that occurs when the first guide jigs 51 are inserted into the tooth holes 25. That is, a reduction in dimensional accuracy of the coaxially wound coils 20, a reduction in insulation properties, and work hardening of the material are prevented.

Figure 7:
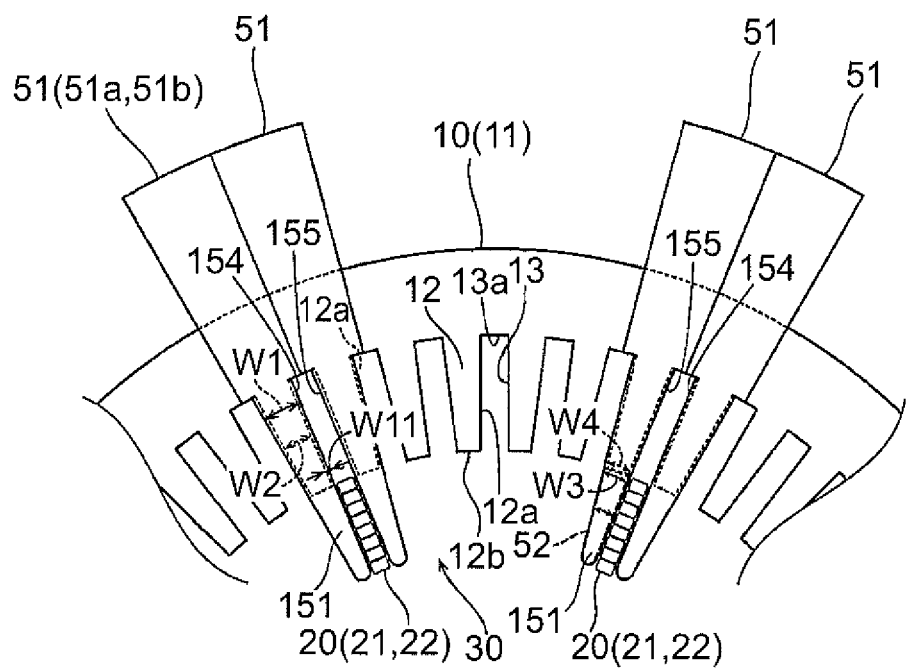
FIG. 7 illustrates guide jigs disposed in the stator core according to the first embodiment of the present disclosure as seen from above.

In the first embodiment, as illustrated in FIG. 7, the width W1 of the first guide jigs 51 in the circumferential direction at each position in the radial direction is equal to or more than a width W2 of the teeth 12 in the circumferential direction at the same position in the radial direction as seen in the rotational axis direction. Specifically, the width W1 of the first guide jigs 51 in the circumferential direction at each position in the radial direction is larger than the width W2 of the teeth 12 in the circumferential direction at the same position in the radial direction. Particularly, the width W1 of the first guide jigs 51 is larger than the width W2 of the teeth 12 by a width W11 on one side in the circumferential direction (2×W11 in total). That is, the edge portions 12a of the teeth 12 which extend in the radial direction are covered by the first guide jigs 51 as seen in the rotational axis direction.

In the first embodiment, as illustrated in FIG. 7, the first guide jigs 51 are formed to have portions 151 that extend from end portions 12b of the teeth 12 on the radially inner side to the radially inner space 30 of the stator core 10, which is on the radially inner side with respect to the end portions 12b of the teeth 12 on the radially inner side, as seen in the rotational axis direction. That is, the first guide jigs 51 are configured to guide the coaxially wound coils 20 from the radially inner space 30 of the stator core 10 to end portions 13a of the slots 13 on the radially outer side.

As illustrated in FIG. 6, the first guide jigs 51 include first guide jigs 51a and 51b disposed on both one side and the other side, respectively, of the teeth 12 in the rotational axis direction. The first guide jigs 51a and 51b have generally the same shape as each other. Portions (corner portions 152, on the outer side in the rotational axis direction, of portions that guide the coaxially wound coils 20) of the first guide jigs 51 (first guide jigs 51a and 51b) that contact the coaxially wound coils 20 have been chamfered into a round shape.

In the first embodiment, as illustrated in FIG. 6, cut portions 154 in a stepped shape are provided on the side of end portions 153 of the first guide jigs 51 in the circumferential direction, the cut portions 154 being cut into a shape corresponding to the shape of the slots 13 as seen in the rotational axis direction with the first guide jigs 51 disposed so as to overlap the teeth 12 (see FIG. 7). The cut portions 154 are provided on the radially inner side of the first guide jigs 51.

As illustrated in FIG. 7, in the case where two first guide jigs 51 are disposed on the teeth 12 adjacent to each other, a guide hole 155 that guides the coaxially wound coil 20 when inserting the coaxially wound coil 20 into the slot 13 is formed from the cut portion 154 of one of the two adjacent first guide jigs 51 and the cut portion 154 of the other. The guide hole 155 has a shape (generally U-shape) corresponding to the shape of the slot 13 as seen in the axial direction.

The first guide jigs 51 (first guide jigs 51a and 51b) are disposed so as to contact end surfaces of the teeth 12 on one side and the other side in the rotational axis direction when inserting the coaxially wound coils 20 into the slots 13.

(Structure of Second Guide Jigs)

In the first embodiment, as illustrated in FIG. 6, a width W3 (see FIG. 7) of the second guide jigs 52 in the circumferential direction gradually becomes smaller from the radially outer side toward the radially inner side as seen in the rotational axis direction, and the second guide jigs 52 are disposed in the radially inner space 30 of the stator core 10 on the radially inner side of the teeth 12. The second guide jigs 52 each have a plate shape. The second guide jigs 52 are configured to guide the slot housed portions 21 and 22 of the coaxially wound coils 20 from the circumferential direction when inserting the coaxially wound coils 20 into the slots 13. The second guide jigs 52 are an example of the "slot housed portion guide jigs".

As illustrated in FIG. 7, the second guide jigs 52 are disposed in the radially inner space 30 of the stator core 10 such that end portions 52a (see FIG. 6) of the second guide jigs 52 on the radially outer side and the end portions 12b of the teeth 12 on the radially inner side abut against each other. The width W3, in the circumferential direction, of the end portions 52a of the second guide jigs 52 on the radially outer side is equal to or more than a width W4, in the circumferential direction, of the end portions 12b of the teeth 12 on the radially inner side as seen in the rotational axis direction. Specifically, in the first embodiment, the width W3, in the circumferential direction, of the end portions 52a of the second guide jigs 52 on the radially outer side is larger than the width W4, in the circumferential direction, of the end portions 12b of the teeth 12 on the radially inner side as seen in the rotational axis direction. The width W3 of the second guide jigs 52 in the circumferential direction at each position in the radial direction is generally equal to the width W1 of the first guide jigs 51 (portions 151 formed to extend to the radially inner space 30) in the circumferential direction at each position in the radial direction as seen in the rotational axis direction.

As illustrated in FIG. 6, a length L1 of the second guide jigs 52 along the rotational axis direction is generally equal to a length L2 (see FIG. 2) of the teeth 12 along the rotational axis direction. Consequently, surfaces 12c (side surfaces) (see FIG. 2) of the teeth 12 on the radially inner side are covered by the second guide jigs 52. That is, edge portions 12d (edge portions 12d along the rotational axis direction; see FIG. 2) of the surfaces 12c (side surfaces) of the teeth 12 on the radially inner side are covered by the second guide jigs 52.

The second guide jigs 52 are configured to be disposed in spaces (tooth holes 25; see FIG. 4) between the first guide jigs 51a and 51b. As illustrated in FIG. 7, the second guide jigs 52 are disposed between the first guide jigs 51a and 51b such that the portions 151 of the first guide jigs 51 which are formed to extend to the radially inner space 30 of the stator core 10 and the second guide jigs 52 overlap each other as seen in the rotational axis direction.

(Effect of Assembly Apparatus According to First Embodiment)

The following effects can be obtained with the first embodiment.

In the first embodiment, as described above, the guide jigs 50 (first guide jigs 51) are provided to guide a plurality of the coaxially wound coils 20, which form the coil assembly 40 disposed in the radially inner space 30 of the stator core 10, such that the separation interval between the slots 13 and the edge portions 12a of the teeth 12 which extend in the radial direction is kept in the course of the slot housed portions 21 and 22 moving in the slots 13 when inserting the coaxially wound coils 20 into the slots 13 of the stator core 10. Consequently, the guide jigs 50 prevent the coaxially wound coils 20 from contacting the edge portions 12a of the teeth 12 which extend in the radial direction when inserting the coaxially wound coils 20 into the slots 13 of the stator core 10. Thus, the coaxially wound coils 20 are prevented from being damaged due to contact between the coaxially wound coils 20 and the edge portions 12a of the teeth 12 which extend in the radial direction when inserting the slot housed portions 21 and 22 of the coaxially wound coils 20 into the slots 13 of the stator core 10.

(Stator Assembly Method)

Next, an assembly method for the stator 100 will be described with reference to FIGS. 7 to 20. FIGS. 11 to 14, 17, 19, and 20 are each a sectional view of the stator 100 (stator core 10).

<Step of Forming Coil Assembly>

Figure 8:
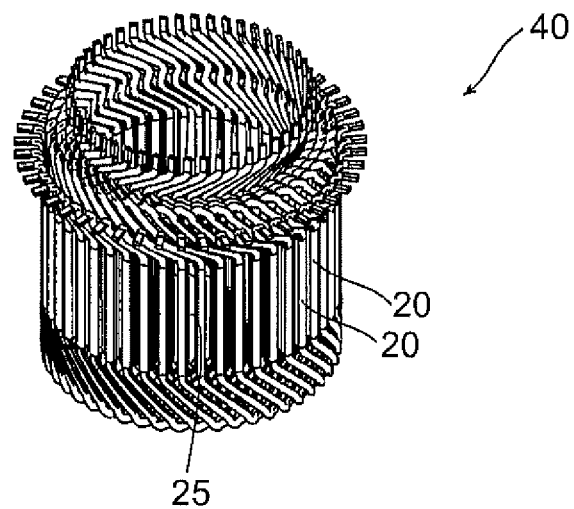
FIG. 8 illustrates a step of forming a coil assembly according to the first embodiment of the present disclosure.

First, as illustrated in FIG. 8, the coil assembly 40 in which the plurality of coaxially wound coils 20 are disposed in an annular arrangement is formed. Specifically, the plurality of coaxially wound coils 20 are disposed adjacent to each other in the circumferential direction as displaced from each other by the pitch of the slots 13. The coaxially wound coils 20, which are disposed adjacent to each other in the circumferential direction, are disposed (see FIG. 5) such that the rectangular conductive wires in each level are arranged alternately in the stacking direction (radial direction). With the coil assembly 40 formed from the plurality of coaxially wound coils 20, the tooth holes 25 (see FIG. 4), into which the teeth 12 of the stator core 10 are to be inserted, are formed between the slot housed portion 21 of one of coaxially wound coils 20 disposed adjacent to each other in the circumferential direction and the slot housed portion 21 of the other.

<Step of Inserting Insulating Members>

Figure 9:
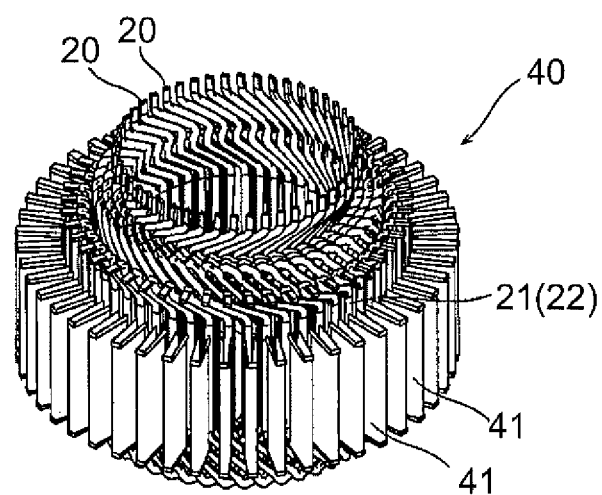
FIG. 9 illustrates a step of mounting insulating members to the coil assembly according to the first embodiment of the present disclosure.
Figure 10:
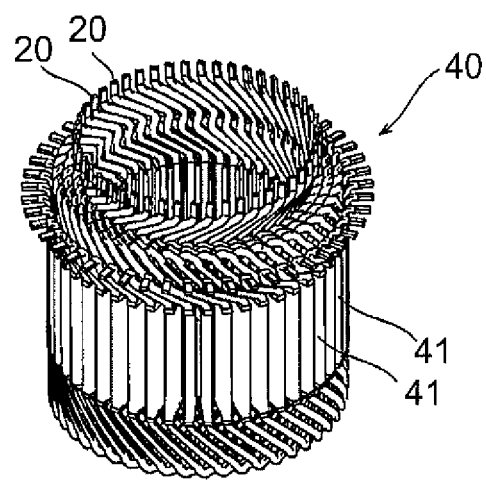
FIG. 10 illustrates a state in which the insulating members are mounted to the coil assembly according to the first embodiment of the present disclosure.

Next, as illustrated in FIGS. 9 and 10, the insulating members 41 are mounted to the slot housed portions 21 and 22 of the coaxially wound coils 20 after the step of forming the coil assembly 40. The insulating members 41 are moved from the radially outer side toward the radially inner side of the coil assembly 40 to be mounted to the slot housed portions 21 and 22.

<Step of Inserting Guide Jigs>

Here, in the first embodiment, the guide jigs 50 (the first guide jigs 51a and 51b and the second guide jigs 52) are inserted into the coaxially wound coils 20 which form the coil assembly 40 after the step of forming the coil assembly 40 and further after the step of inserting the insulating members.

Figure 11:
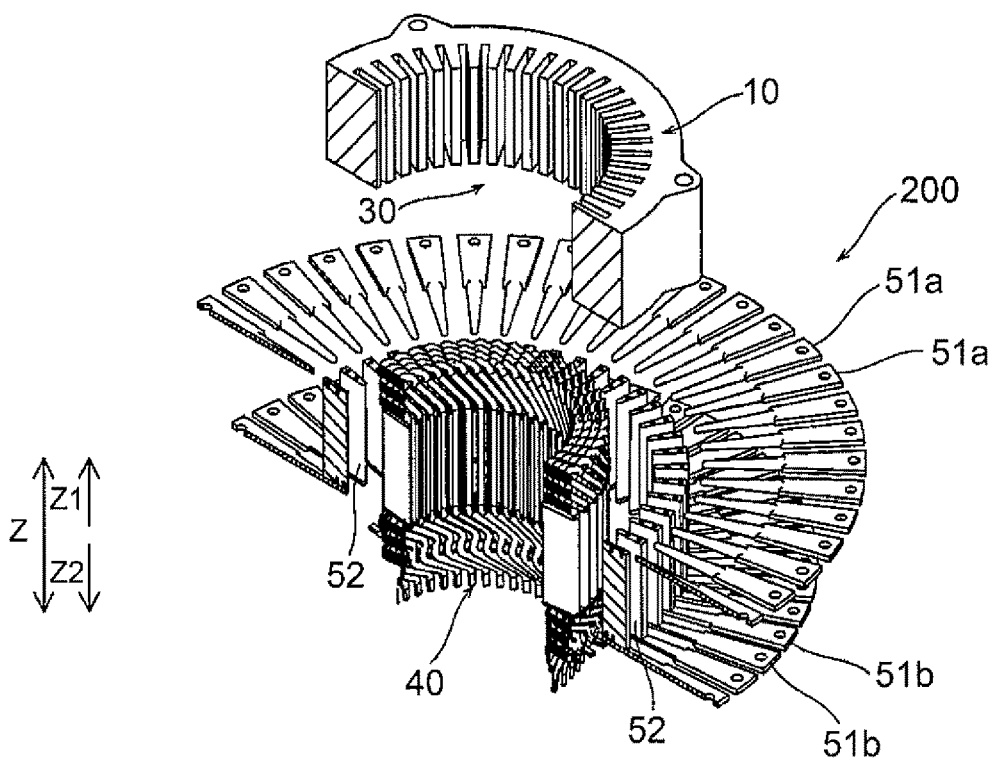
FIG. 11 illustrates a step of inserting the guide jigs into the coil assembly (stator assembly apparatus) according to the first embodiment of the present disclosure.

Specifically, as illustrated in FIG. 11, the coil assembly 40 with the insulating members 41 mounted, the plurality of guide jigs 50, and the stator core 10 are disposed at predetermined positions. Particularly, the plurality of guide jigs 50 (the first guide jigs 51a and 51b and the second guide jigs 52) are disposed on the radially outer side of the coil assembly 40, and the stator core 10 is disposed on the side in the rotational axis direction with respect to the coil assembly 40.

Figure 12:
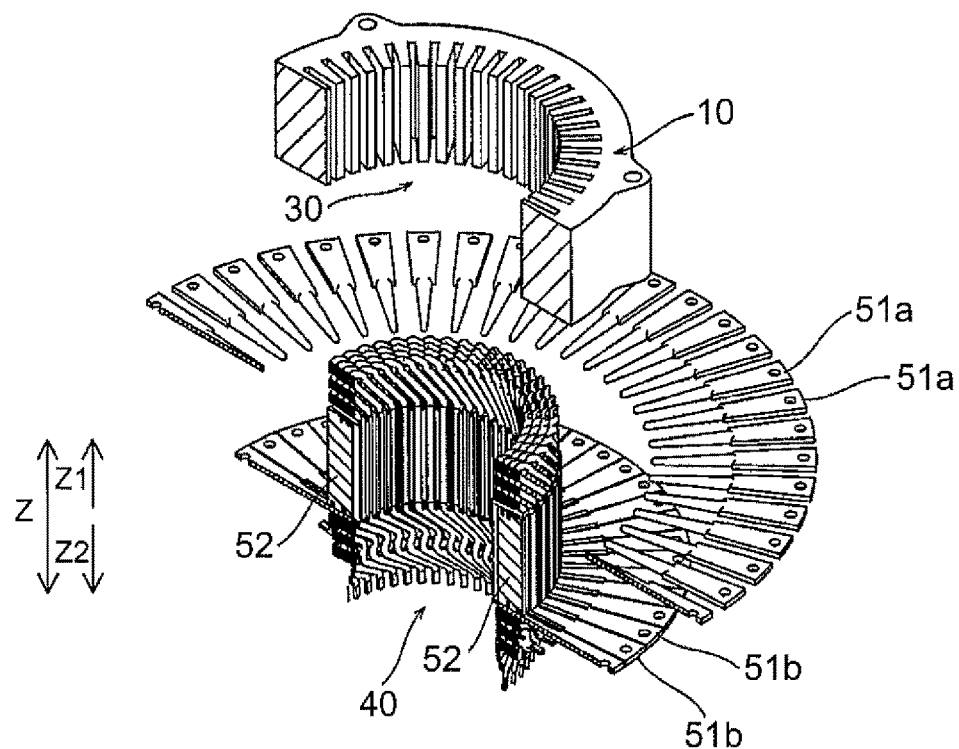
FIG. 12 illustrates a step of inserting first guide jigs on the side in the Z2 direction and second guide jigs into the coil assembly according to the first embodiment of the present disclosure.

Next, in the first embodiment, as illustrated in FIG. 12, the plurality of guide jigs 50 are inserted into the coaxially wound coils 20 from the radially outer side toward the radially inner side of the coil assembly 40. Specifically, the plurality of first guide jigs 51b which are disposed on one side (side in the Z2 direction) in the rotational axis direction (Z direction) and the plurality of second guide jigs 52 are inserted all at once into the tooth holes 25 of the coil assembly 40.

Figure 13:
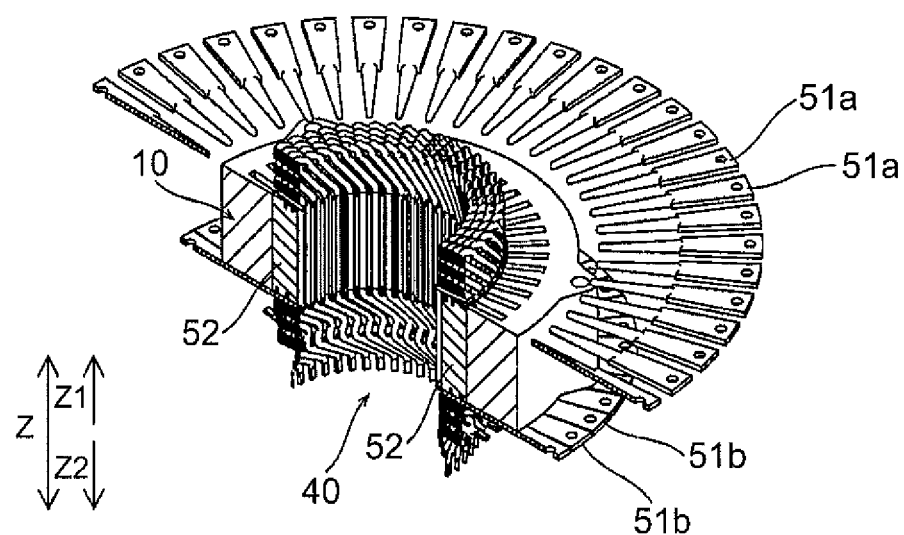
FIG. 13 illustrates a step of inserting the stator core into the coil assembly according to the first embodiment of the present disclosure.

Next, as illustrated in FIG. 13, the stator core 10 is relatively moved along the rotational axis direction (Z direction) with respect to the coil assembly 40 so that the coil assembly 40 is disposed in the radially inner space 30 of the stator core 10. Specifically, the stator core 10 is assembled to the coil assembly 40 by being moved with respect to the coil assembly 40 from the side (side in the Z1 direction) of the coil assembly 40 on which the guide jigs 50 (first guide jigs 51b) are not attached.

Figure 14:
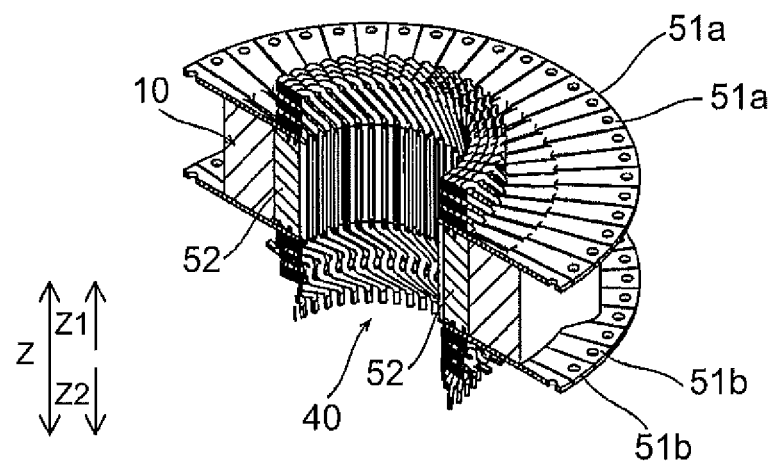
FIG. 14 illustrates a step of inserting first guide jigs on the side in the Z1 direction into the coil assembly according to the first embodiment of the present disclosure.

Next, in the first embodiment, as illustrated in FIG. 14, the plurality of guide jigs 50 (first guide jigs 51a) are inserted all at once into the coaxially wound coils 20 from the radially outer side toward the radially inner side of the coil assembly 40.

Figure 15:
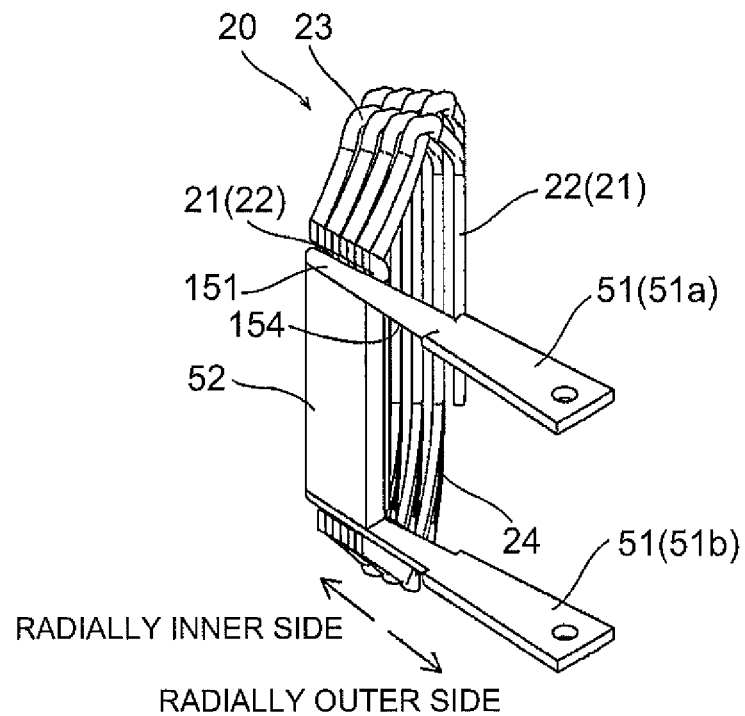
FIG. 15 illustrates a step of inserting slot housed portions into the slots (before insertion) according to the first embodiment of the present disclosure.

Consequently, as illustrated in FIGS. 7 and 15, the slot housed portions 21 (or the slot housed portions 22) of the coaxially wound coils 20 are disposed so as to be adjacent, in the circumferential direction, to the portions 151 of the first guide jigs 51 which are formed to extend to the radially inner space 30 of the stator core 10. The slot housed portions 21 (or the slot housed portions 22) of the coaxially wound coils 20 are also disposed so as to be adjacent, in the circumferential direction, to the second guide jigs 52 in a plate shape. As illustrated in FIG. 7, the second guide jigs 52 are disposed such that the end portions 52a of the second guide jigs 52 on the radially outer side abut against the end portions 12b of the teeth 12 on the radially inner side. Consequently, the stator core 10 and the coil assembly 40 are positioned with respect to each other.

<Step of Inserting Slot Housed Portions into Slots>

Figure 16:
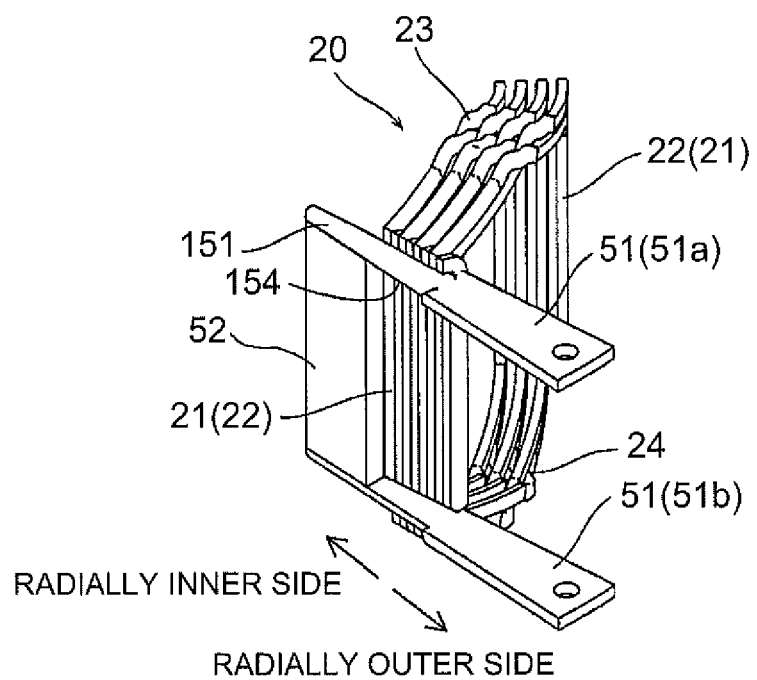
FIG. 16 illustrates a step of inserting the slot housed portions into the slots (after insertion) according to the first embodiment of the present disclosure.
Figure 17:
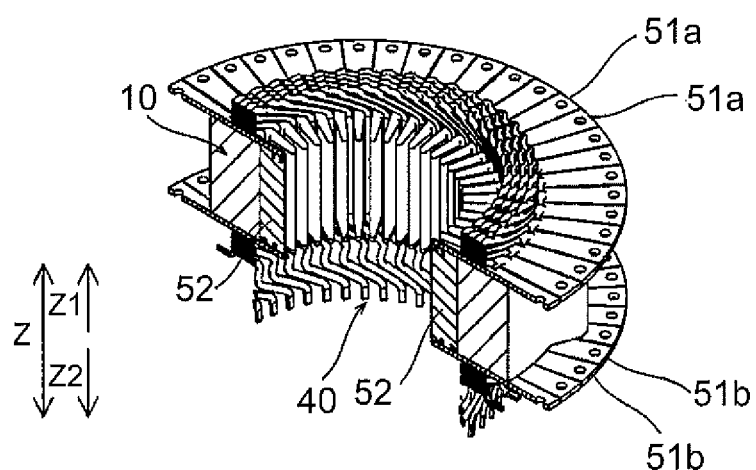
FIG. 17 is a perspective view illustrating a state in which the slot housed portions are inserted into the slots according to the first embodiment of the present disclosure.

Next, as illustrated in FIGS. 16 and 17, the slot housed portions 21 and 22 of the plurality of coaxially wound coils 20 which form the coil assembly 40 are inserted into the slots 13 of the stator core 10 by pushing out the coaxially wound coils 20 from the radially inner side toward the radially outer side with the coil assembly 40 disposed in the radially inner space 30 of the stator core 10. Specifically, the slot housed portions 21 and 22 of the coaxially wound coils 20 are inserted into the slots 13 of the stator core 10 by pushing out the coil end portions 23 and 24 of the coaxially wound coils 20 from the radially inner side toward the radially outer side using the roller (not illustrated). At this time, the roller relatively moves with respect to the coil assembly 40 so that a portion of the coil assembly 40 pushed out by the roller is gradually varied, gradually inserting the coil assembly 40.

Here, in the first embodiment, the slot housed portions 21 and 22 of the plurality of coaxially wound coils 20, which form the coil assembly 40 disposed in the radially inner space 30 of the stator core 10, are inserted into the slots 13 of the stator core 10 by pushing out the plurality of coaxially wound coils 20 which form the coil assembly 40 from the radially inner side toward the radially outer side while the guide jigs 50 (first guide jigs 51a and 51b) are guiding the coaxially wound coils 20 such that the separation interval (width W11 as seen in the axial direction; see FIG. 7) between the coaxially wound coils 20 and the edge portions 12a of the teeth 12 which extend in the radial direction is kept in the course of the slot housed portions 21 and 22 moving in the slots 13 when inserting the coaxially wound coils 20 into the stator core 10.

Particularly, in the first embodiment, as illustrated in FIG. 7, the slot housed portions 21 and 22 are inserted into the slots 13 while the first guide jigs 51a and 51 b are guiding the coaxially wound coils 20 with the first guide jigs 51a and 51 b disposed on both the other side (side in the Z1 direction) and one side (side in the Z2 direction), respectively, of the teeth 12 in the rotational axis direction such that the first guide jigs 51a and 51b overlap the teeth 12 as seen in the rotational axis direction.

The coaxially wound coils 20 are guided by the guide holes 155 which are formed from the cut portion 154 of one of two adjacent first guide jigs 51 and the cut portion 154 of the other as seen in the rotational axis direction.

Here, the width W1 of the first guide jigs 51a and 51b in the circumferential direction at each position in the radial direction is larger than the width W2 of the teeth 12 in the circumferential direction at the same position in the radial direction as seen in the rotational axis direction. Therefore, the slot housed portions 21 and 22 are inserted into the slots 13 without the slot housed portions 21 and 22 and the edge portions 12a of the teeth 12 contacting each other.

In the first embodiment, the slot housed portions 21 and 22 are inserted into the slots 13 by pushing out the coaxially wound coils 20 from the radially inner side toward the radially outer side while the coaxially wound coils 20 are guided from the radially inner space 30 of the stator core 10 by the portions 151 of the first guide jigs 51 which are formed to extend to the radially inner space 30 of the stator core 10.

In the first embodiment, further, the slot housed portions 21 and 22 are inserted into the slots 13 by pushing out the coaxially wound coils 20 from the radially inner side toward the radially outer side while the second guide jigs 52 are guiding the coaxially wound coils 20 with the second guide jigs 52 disposed in the radially inner space 30 of the stator core 10 on the radially inner side of the teeth 12. Here, the width W3, in the circumferential direction, of the end portions 52a of the second guide jigs 52 on the radially outer side is larger than the width W4, in the circumferential direction, of the end portions 12b of the teeth 12 on the radially inner side as seen in the rotational axis direction. Therefore, the slot housed portions 21 and 22 are inserted into the slots 13 without the coaxially wound coils 20 contacting the end portions 12b of the teeth 12 on the radially inner side.

In the first embodiment, in this way, the slot housed portions 21 and 22 are inserted into the slots 13 by pushing out the coaxially wound coils 20 from the radially inner side toward the radially outer side while the first guide jigs 51 and the second guide jigs 52 are guiding the coaxially wound coils 20 with the portions 151 of the first guide jigs 51 which are formed to extend to the radially inner space 30 of the stator core 10 and the second guide jigs 52 overlapping each other as seen in the rotational axis direction.

Figure 18:
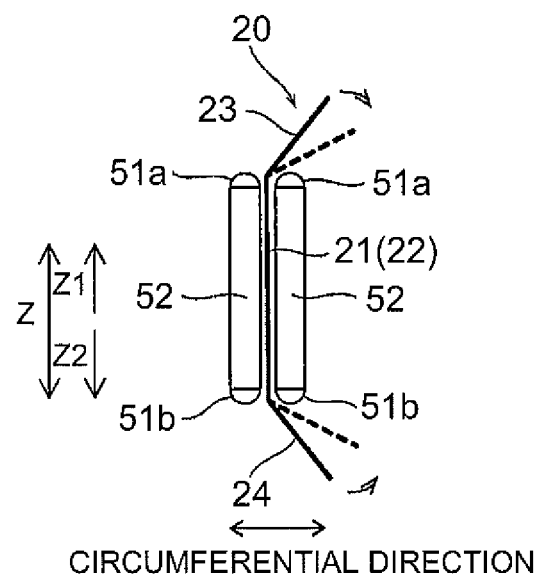
FIG. 18 illustrates a state in which the slot housed portions are inserted into the slots according to the first embodiment of the present disclosure.

That is, as illustrated in FIG. 18, the slot housed portions 21 and 22 are guided by two first guide jigs 51a and 51b (cut portions 154) that are adjacent to each other in the circumferential direction, and guided by two second guide jigs 52 that are adjacent to each other in the circumferential direction. Consequently, the slot housed portions 21 and 22 are prevented from bulging in the circumferential direction and buckling in the circumferential direction when inserting the slot housed portions 21 and 22 into the slots 13.

<Step of Removing Guide Jigs>

Figure 19:
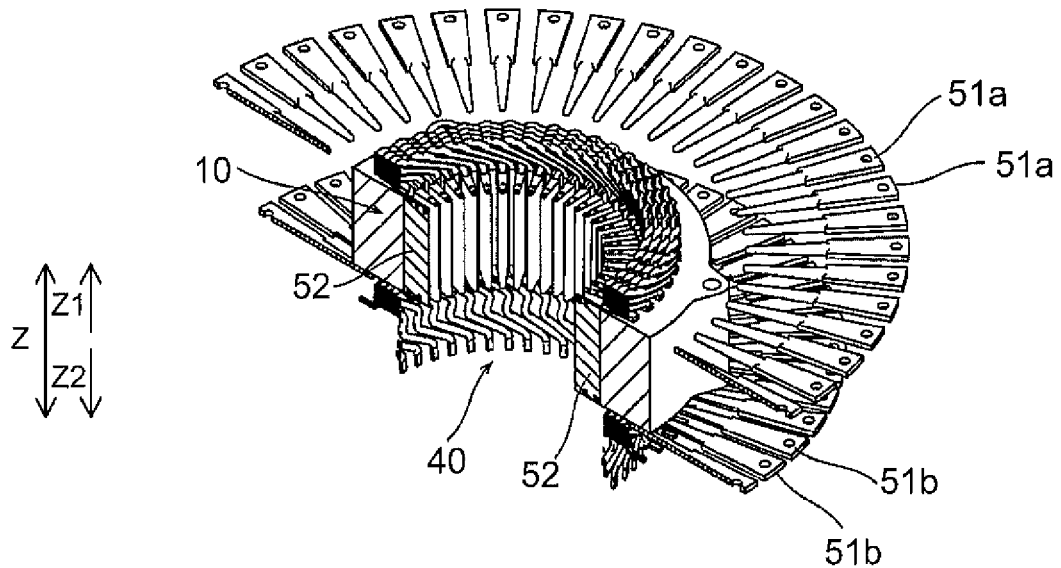
FIG. 19 illustrates a step (1) of removing the guide jigs according to the first embodiment of the present disclosure.

Next, the guide jigs 50 are removed from the stator 100 to which the coaxially wound coils 20 have been mounted. Specifically, first, as illustrated in FIG. 19, the first guide jigs 51a are moved from the radially inner side toward the radially outer side of the coil assembly 40 so that the first guide jigs 51a are removed from the stator 100.

Figure 20:
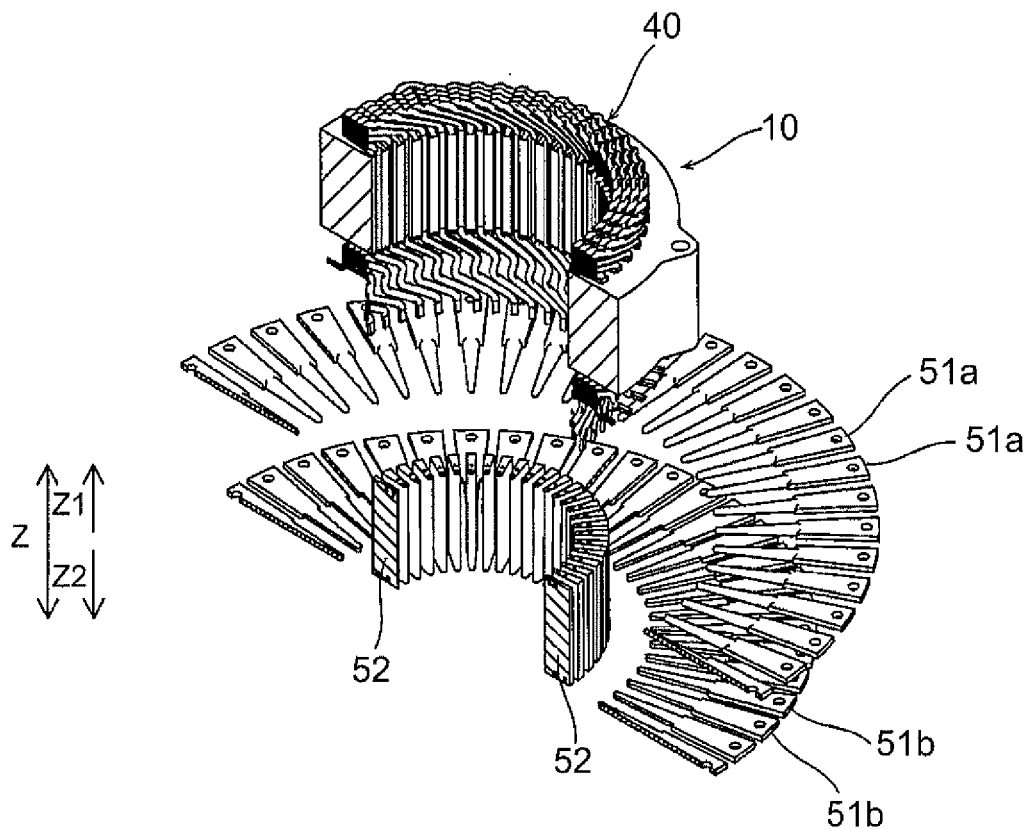
FIG. 20 illustrates a step (2) of removing the guide jigs according to the first embodiment of the present disclosure.

Next, as illustrated in FIG. 20, the stator 100 to which the coaxially wound coils 20 have been mounted is moved in the Z1 direction. Lastly, the first guide jigs 51b and the second guide jigs 52 are moved from the radially inner side toward the radially outer side. That is, the first guide jigs 51a and 51b and the second guide jigs 52 are returned to the predetermined positions before the assembly of the stator 100. Consequently, the assembly of the stator 100 is finished.

(Effect of Assembly Method According to First Embodiment)

The following effects can be obtained with the first embodiment.

In the first embodiment, as described above, there is provided a step of inserting the slot housed portions 21 and 22 of the plurality of coaxially wound coils 20, which form the coil assembly 40 disposed in the radially inner space 30 of the stator core 10, into the slots 13 of the stator core 10 by pushing out the plurality of coaxially wound coils 20 which form the coil assembly 40 from the radially inner side toward the radially outer side while the first guide jigs 51 are guiding the coaxially wound coils 20 such that the separation interval between the coaxially wound coils 20 and the edge portions 12a of the teeth 12 which extend in the radial direction is kept in the course of the slot housed portions 21 and 22 moving in the slots 13 when inserting the coaxially wound coils 20 into the stator core 10. Consequently, the coaxially wound coils 20 are prevented from contacting the edge portions 12a of the teeth 12 which extend in the radial direction when inserting the coaxially wound coils 20 into the slots 13 of the stator core 10. Thus, the coaxially wound coils 20 are prevented from being damaged due to contact between the coaxially wound coils 20 and the edge portions 12a of the teeth 12 which extend in the radial direction when inserting the slot housed portions 21 and 22 of the coaxially wound coils 20 into the slots 13 of the stator core 10.

In the first embodiment, as described above, the width of the first guide jigs 51 in the circumferential direction gradually becomes smaller from the radially outer side toward the radially inner side as seen in the rotational axis direction, and the first guide jigs 51 are disposed so as to overlap the teeth 12. The step of inserting the slot housed portions 21 and 22 into the slots 13 includes a step of inserting the slot housed portions 21 and 22 into the slots 13 while the first guide jigs 51 are guiding the coaxially wound coils 20 with the first guide jigs 51 disposed so as to overlap the teeth 12 as seen in the rotational axis direction. Consequently, since the surfaces (the upper surfaces and the lower surfaces) of the teeth 12 on the side in the rotational axis direction are covered by the first guide jigs 51, the first guide jigs 51 can effectively prevent the coaxially wound coils 20 from contacting the edge portions 12a of the surfaces (the upper surfaces and the lower surfaces) of the teeth 12 on the side in the rotational axis direction.

In the first embodiment, as described above, the width W1 of the first guide jigs 51 in the circumferential direction at each position in the radial direction is larger than the width W2 of the teeth 12 in the circumferential direction at the same position in the radial direction as seen in the rotational axis direction. Consequently, not only the upper surfaces (or the lower surfaces) of the teeth 12 but also portions of the teeth 12 on the outer side with respect to the edge portions 12a in the circumferential direction are covered by the first guide jigs 51. Thus, the coaxially wound coils 20 can be reliably prevented from contacting the edge portions 12a of the teeth 12.

In the first embodiment, as described above, the first guide jigs 51 are formed to extend from the end portions 12b of the teeth 12 on the radially inner side to the radially inner space 30 of the stator core 10, which is on the radially inner side with respect to the end portions 12b of the teeth 12 on the radially inner side, as seen in the rotational axis direction; and the step of inserting the slot housed portions 21 and 22 into the slots 13 includes a step of inserting the slot housed portions 21 and 22 into the slots 13 by pushing out the coaxially wound coils 20 from the radially inner side toward the radially outer side while the first guide jigs 51 are guiding the coaxially wound coils 20 from the radially inner space 30 of the stator core 10. Consequently, the slot housed portions 21 and 22 are guided from the radially inner side with respect to the end portions 12b of the teeth 12 on the radially inner side. Thus, the slot housed portions 21 and 22 can be inserted into the slots 13 more smoothly.

In the first embodiment, as described above, portions of the first guide jigs 51 that contact the coaxially wound coils 20 have been chamfered into a round shape. Consequently, the coaxially wound coils 20 can be effectively prevented from being damaged due to contact between the coaxially wound coils 20 and the first guide jigs 51.

In the first embodiment, as described above, the cut portions 154 in a stepped shape are provided on the side of the end portions 153 of the first guide jigs 51 in the circumferential direction, the cut portions 154 being cut into a shape corresponding to the shape of the slots 13 as seen in the rotational axis direction with the first guide jigs 51 disposed so as to overlap the teeth 12. Consequently, the guide holes 155 can be formed by the cut portion 154 of one of two adjacent first guide jigs 51 and the cut portion 154 of the other. Thus, the coaxially wound coils 20 can be smoothly inserted into the slots 13 by the guide holes 155.

In the first embodiment, as described above, the second guide jigs 52 are provided, the width W3 of the second guide jigs 52 in the circumferential direction gradually becoming smaller from the radially outer side toward the radially inner side as seen in the rotational axis direction, and the second guide jigs 52 being disposed in the radially inner space 30 of the stator core 10 on the radially inner side of the teeth 12. The step of inserting the slot housed portions 21 and 22 into the slots 13 includes a step of inserting the slot housed portions 21 and 22 into the slots 13 by pushing out the coaxially wound coils 20 from the radially inner side toward the radially outer side while the second guide jigs 52 are guiding the coaxially wound coils 20 with the second guide jigs 52 disposed in the radially inner space 30 of the stator core 10 on the radially inner side of the teeth 12. Consequently, the slot housed portions 21 and 22 are guided (interposed) by two second guide jigs 52 that are adjacent to each other in the circumferential direction. Thus, the slot housed portions 21 and 22 can be prevented from bulging in the circumferential direction and buckling in the circumferential direction when inserting the slot housed portions 21 and 22 into the slots 13.

In the first embodiment, as described above, the width W3, in the circumferential direction, of the end portions 52a of the second guide jigs 52 on the radially outer side is larger than the width W4, in the circumferential direction, of the end portions 12b of the teeth 12 on the radially inner side as seen in the rotational axis direction. Consequently, the surfaces 12c (side surfaces) of the teeth 12 on the radially inner side are covered by the second guide jigs 52. Thus, the second guide jigs 52 can prevent the coaxially wound coils 20 from contacting the edge portions 12d (the edge portions 12d along the rotational axis direction) of the surfaces 12c (side surfaces) of the teeth 12 on the radially inner side.

In the first embodiment, as described above, the step of inserting the slot housed portions 21 and 22 into the slots 13 includes a step of inserting the slot housed portions 21 and 22 into the slots 13 by pushing out the coaxially wound coils 20 from the radially inner side toward the radially outer side while the first guide jigs 51 and the second guide jigs 52 are guiding the coaxially wound coils 20 with the portions 151 of the first guide jigs 51 which are formed to extend to the radially inner space 30 of the stator core 10 and the second guide jigs 52 overlapping each other as seen in the rotational axis direction. Consequently, the coaxially wound coils 20 are guided by both the first guide jigs 51 and the second guide jigs 52. Thus, the slot housed portions 21 and 22 can be inserted into the slots 13 more smoothly.

In the first embodiment, as described above, a step of inserting the guide jigs 50 (the first guide jigs 51 and the second guide jigs 52) into the coaxially wound coils 20 which form the coil assembly 40 is provided after the step of forming the coil assembly 40. Consequently, all of the plurality of guide jigs 50 can be inserted into the coil assembly 40 (coaxially wound coils 20) in a single step. Thus, an increase in number of steps can be prevented. As a result, the manufacturing process can be simplified.

In the first embodiment, as described above, the step of inserting the guide jigs 50 (the first guide jigs 51 and the second guide jigs 52) into the coaxially wound coils 20 is a step of inserting the guide jigs 50 into the coaxially wound coils 20 from the radially outer side toward the radially inner side of the coil assembly 40. Consequently, a device that moves the guide jigs 50 can be disposed on the radially outer side of the coil assembly 40, where a relatively large space is available, unlike a case where the guide jigs 50 are inserted into the coaxially wound coils 20 from the radially inner side toward the radially outer side of the coil assembly 40. That is, the device which moves the guide jigs 50 can be disposed easily.

[Second Embodiment]
(Stator Assembly Method)

An assembly method (assembly apparatus 201) for a stator 110 according to a second embodiment will be described with reference to FIG. 21. In the second embodiment, unlike the first embodiment in which the guide jigs 50 are inserted into the coaxially wound coils 20 after the step of forming the coil assembly 40, the guide jigs 50 are inserted into the coaxially wound coils 20 in the middle of forming a coil assembly 140.

<Step of Forming Coil Assembly and Step of Inserting Guide Jigs>

Figure 21:
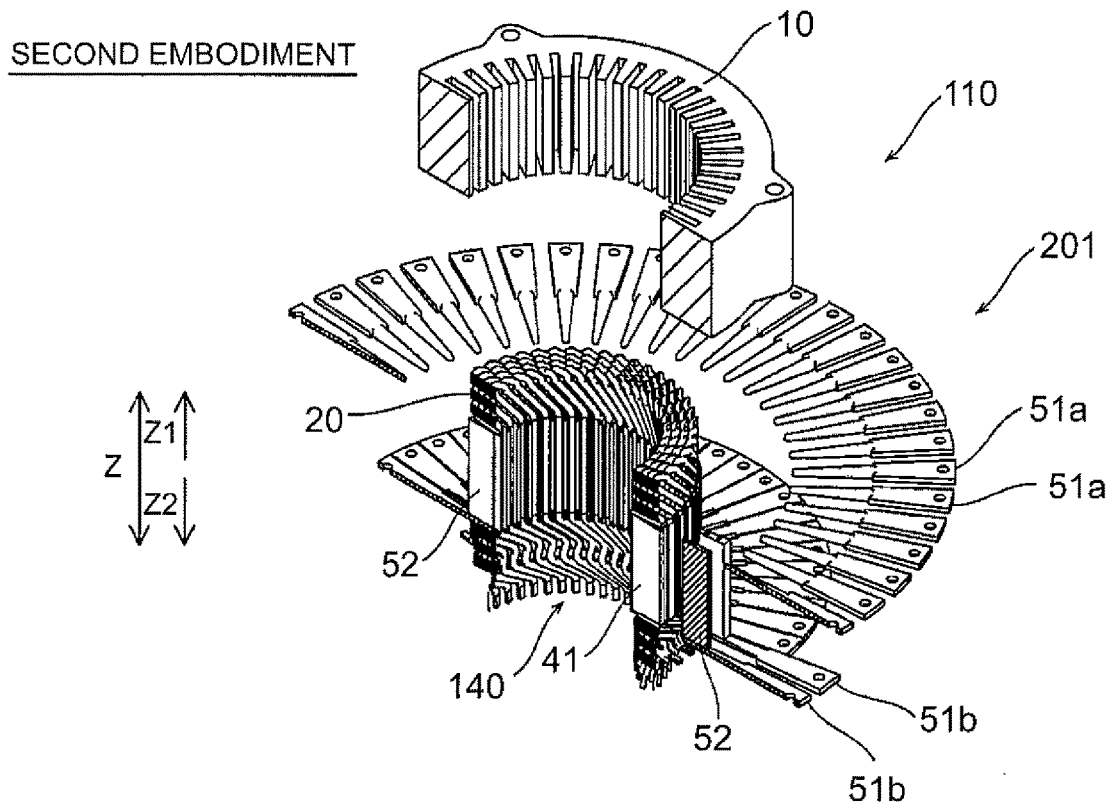
FIG. 21 illustrates a step of inserting guide jigs into a coil assembly according to a second embodiment of the present disclosure.

In the second embodiment, as illustrated in FIG. 21, the guide jigs 50 are inserted into the coaxially wound coils 20 in the middle of forming the coil assembly 140. Specifically, the plurality of coaxially wound coils 20 (some coaxially wound coils 20, among all of the coaxially wound coils 20) are disposed adjacent to each other, and thereafter the insulating members 41 are mounted to the slot housed portions 21 and 22 of the coaxially wound coils 20. After that, the plurality of guide jigs 50 (the first guide jigs 51b and the second guide jigs 52) are sequentially inserted into the tooth holes 25 (see FIG. 4) of the coil assembly 140. Further, after all of the coaxially wound coils 20 are disposed adjacent to each other (after the coil assembly 140 is completed), the stator core 10 is attached to the coil assembly 140. Lastly, the plurality of guide jigs 50 (first guide jigs 51a) are sequentially inserted into the tooth holes 25.

The other steps of the second embodiment are the same as those of the first embodiment.

(Effect of Second Embodiment)

The following effects can be obtained with the second embodiment.

In the second embodiment, as described above, the step of forming the coil assembly 140 includes a step of inserting the guide jigs 50 into the coaxially wound coils 20 in the middle of disposing the plurality of coaxially wound coils 20 in an annular arrangement to form the coil assembly 140. Consequently, the plurality of guide jigs 50 can be inserted into the coaxially wound coils 20 one by one. Thus, a drive force for moving the guide jigs 50 can be reduced unlike a case where all of the plurality of guide jigs 50 are inserted all at once into the coil assembly 140 (coaxially wound coils 20) in a single step (i.e. unlike a case where all of the guide jigs 50 are moved at the same time).

[Modification]

The embodiments disclosed herein should be considered as exemplary and non-limiting in all respects.

For example, in the first and second embodiments, the coil assembly is constituted by coaxially wound coils formed from a rectangular conductive wire. However, the present disclosure is not limited thereto. For example, the coil assembly may be constituted by coaxially wound coils formed from a round wire, or coils other than coaxially wound coils such as wave wound coils.

In the first and second embodiments, in the coil assembly, the coaxially wound coils, which are disposed adjacent to each other in the circumferential direction, are disposed such that the rectangular conductive wires in each level are arranged alternately in the stacking direction (radial direction). However, the present disclosure is not limited thereto. For example, in the coil assembly, the coaxially wound coils may be disposed with the slot housed portions of the coaxially wound coils bundled.

Figure 22:
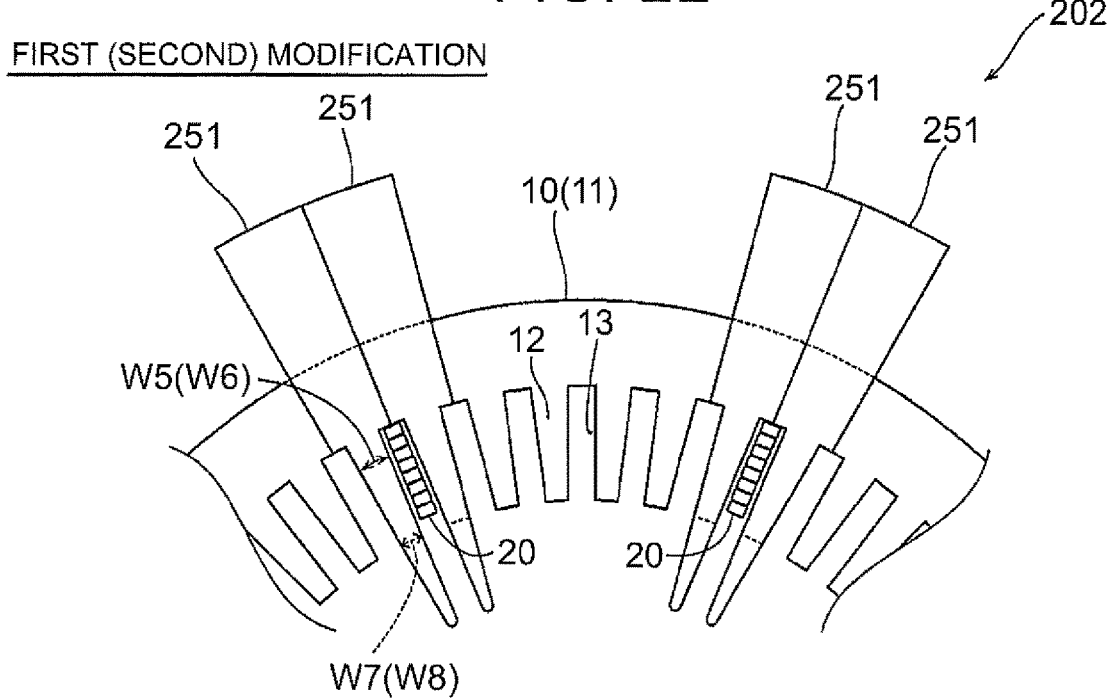
FIG. 22 illustrates guide jigs (stator assembly apparatus) according to a first (second) modification of the first and second embodiments of the present disclosure.

In the first and second embodiments, the width of the first guide jigs in the circumferential direction at each position in the radial direction is larger than the width of the teeth in the circumferential direction at the same position in the radial direction as seen in the rotational axis direction. However, the present disclosure is not limited thereto. For example, as in first guide jigs 251 (assembly apparatus 202) according to a first modification illustrated in FIG. 22, a width W5 of the first guide jigs 251 in the circumferential direction at each position in the radial direction may be equal to a width W6 of the teeth 12 in the circumferential direction at the same position in the radial direction as seen in the rotational axis direction.

In the first and second embodiments, the first guide jigs include the portions which are formed to extend to the radially inner space of the stator core. However, the present disclosure is not limited thereto. For example, the first guide jigs may be formed to extend from end portions on the radially outer side to end portions on the radially inner side of the teeth.

In the first and second embodiments, the first guide jigs are disposed on both one side and the other side of the teeth in the rotational axis direction. However, the present disclosure is not limited thereto. For example, the first guide jigs may be disposed on only one side or the other side of the teeth in the rotational axis direction as long as the coaxially wound coils do not contact the edge portions of the teeth when inserting the coaxially wound coils into the slots.

In the first and second embodiments, the coil assembly is formed in a generally cylindrical shape. However, the present disclosure is not limited thereto. For example, the coil assembly may be formed in a tapered shape (conical shape) in section with a radius gradually varied along the rotational axis direction. In this case, only the side of the end portions formed with a smaller radius may be guided by the first guide jigs.

In the first and second embodiments, the width, in the circumferential direction, of the end portions of the second guide jigs on the radially outer side is larger than the width, in the circumferential direction, of the end portions of the teeth on the radially inner side as seen in the rotational axis direction. However, the present disclosure is not limited thereto. For example, as illustrated with a second modification illustrated in FIG. 22, a width W7, in the circumferential direction, of the end portions of the second guide jigs on the radially outer side may be equal to a width W8, in the circumferential direction, of the end portions of the teeth on the radially inner side as seen in the rotational axis direction.

Figure 23:
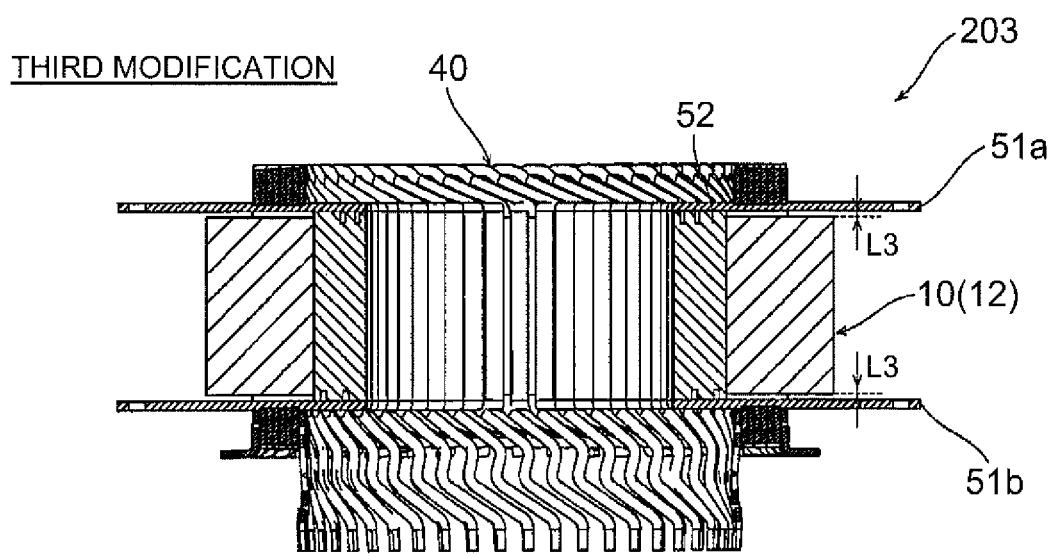
FIG. 23 illustrates a stator assembly apparatus according to a third modification of the first and second embodiments of the present disclosure.

In the first and second embodiments, the first guide jigs are disposed such that the first guide jigs and the teeth (stator core) contact each other with the first guide jigs inserted into the coil assembly (coaxially wound coils). However, the present disclosure is not limited thereto. For example, as in an assembly apparatus 203 for the stator 100 according to a third modification illustrated in FIG. 23, the first guide jigs 51a and 51b may be disposed as spaced from the stator core 10 (teeth 12) by a distance L3. In this case, the width of the first guide jigs in the circumferential direction at each position in the radial direction may be less than the width of the teeth in the circumferential direction at the same position in the radial direction as seen in the rotational axis direction.

In the first and second embodiments, the roller pushes out the coil end portions of the coaxially wound coils from the radially inner side toward the radially outer side. However, the present disclosure is not limited thereto. For example, the slot housed portions may be pushed out by a bar-like or plate-like jig that extends in the axial direction. In this case, the entire circumference of the coil assembly (coaxially wound coils) can be pushed by the bar-like or plate-like jig at the same time.

In the first and second embodiments, the coaxially wound coils are prevented from contacting the edge portions of the teeth which extend in the radial direction when inserting the coaxially wound coils into the slots. However, the present disclosure is not limited thereto. For example, the present disclosure may also be applied to a case where the insulating members (slot paper, insulating paper) are disposed between the coils and the teeth so that the edge portions and the slot paper directly contact each other.

In the first and second embodiments, the insulating members are mounted to the coil assembly. However, the present disclosure is not limited thereto. For example, the coils may be inserted with the insulating members assembled to the slots of the stator core.

The invention claimed is:

1. A stator assembly method in which coils that have slot housed portions and coil ends formed from a conductor are mounted to an annular stator core that includes slots formed between adjacent teeth that extend from a back yoke toward an inner side in a radial direction, comprising:
    forming a coil assembly in which a plurality of the coils are disposed in an annular arrangement; and
    inserting the slot housed portions of the plurality of the coils, which form the coil assembly disposed in a radially inner space of the stator core, into the slots of the stator core by pushing out the plurality of the coils which form the coil assembly from a radially inner side toward a radially outer side while guide jigs are guiding the coils such that a separation interval between the coils and edge portions of the teeth that extend in the radial direction is kept in a course of the slot housed portions moving in the slots when inserting the coils into the slots of the stator core, wherein:
    a width of the guide jigs in a circumferential direction gradually becomes smaller from the radially outer side toward the radially inner side as seen in a rotational axis direction, and the guide jigs are disposed so as to overlap the teeth when viewing the rotational axis direction; and
    the inserting the slot housed portions into the slots includes inserting the slot housed portions into the slots while the guide jigs are guiding the coils with the guide jigs disposed so as to overlap the teeth when viewing the rotational axis direction.

2. The stator assembly method according to claim 1, wherein
    a width of the guide jigs in the circumferential direction at each position in the radial direction is equal to or more than a width of the teeth in the circumferential direction at the same position in the radial direction as seen in the rotational axis direction.

3. The stator assembly method according to claim 2, wherein:
    the guide jigs are formed to extend from end portions of the teeth on the radially inner side to the radially inner space of the stator core, which is on the radially inner side with respect to the end portions of the teeth on the radially inner side, as seen in the rotational axis direction; and
    the inserting the slot housed portions into the slots includes inserting the slot housed portions into the slots by pushing out the coils from the radially inner side toward the radially outer side while the guide jigs are guiding the coils from the radially inner space of the stator core.

4. The stator assembly method according to claim 3, wherein
    portions of the guide jigs that contact the coils have been chamfered into a round shape.

5. The stator assembly method according to claim 2, wherein
    portions of the guide jigs that contact the coils have been chamfered into a round shape.

6. The stator assembly method according to claim 2, wherein
cut portions in a stepped shape are provided on sides of the guide jigs in the circumferential direction, the cut portions being cut into a shape corresponding to a shape of the slots as seen in the rotational axis direction with the guide jigs disposed so as to overlap the teeth.

7. The stator assembly method according to claim 1, wherein:
the guide jigs are formed to extend from end portions of the teeth on the radially inner side to the radially inner space of the stator core, which is on the radially inner side with respect to the end portions of the teeth on the radially inner side, as seen in the rotational axis direction; and
the inserting the slot housed portions into the slots includes inserting the slot housed portions into the slots by pushing out the coils from the radially inner side toward the radially outer side while the guide jigs are guiding the coils from the radially inner space of the stator core.

8. The stator assembly method according to claim 7, wherein
portions of the guide jigs that contact the coils have been chamfered into a round shape.

9. The stator assembly method according to claim 7, wherein
cut portions in a stepped shape are provided on sides of the guide jigs in the circumferential direction, the cut portions being cut into a shape corresponding to a shape of the slots as seen in the rotational axis direction with the guide jigs disposed so as to overlap the teeth.

10. The stator assembly method according to claim 1, wherein
portions of the guide jigs that contact the coils have been chamfered into a round shape.

11. The stator assembly method according to claim 10, wherein
cut portions in a stepped shape are provided on sides of the guide jigs in the circumferential direction, the cut portions being cut into a shape corresponding to a shape of the slots as seen in the rotational axis direction with the guide jigs disposed so as to overlap the teeth.

12. The stator assembly method according to claim 1, wherein
cut portions in a stepped shape are provided on sides of the guide jigs in the circumferential direction, the cut portions being cut into a shape corresponding to a shape of the slots as seen in the rotational axis direction with the guide jigs disposed so as to overlap the teeth.

13. The stator assembly method according to claim 1, wherein:
slot housed portion guide jigs are further provided, a width of the slot housed portion guide jigs in the circumferential direction gradually becoming smaller from the radially outer side toward the radially inner side as seen in the rotational axis direction, and the slot housed portion guide jigs being disposed in the radially inner space of the stator core on the radially inner side of the teeth; and
the inserting the slot housed portions into the slots includes inserting the slot housed portions into the slots by pushing out the coils from the radially inner side toward the radially outer side while the slot housed portion guide jigs are guiding the coils with the slot housed portion guide jigs disposed in the radially inner space of the stator core on the radially inner side of the teeth.

14. The stator assembly method according to claim 13, wherein
a width, in the circumferential direction, of end portions of the slot housed portion guide jigs on the radially outer side is equal to or more than a width, in the circumferential direction, of end portions of the teeth on the radially inner side as seen in the rotational axis direction.

15. The stator assembly method according to claim 13, wherein
the inserting the slot housed portions into the slots includes inserting the slot housed portions into the slots by pushing out the coils from the radially inner side toward the radially outer side while the guide jigs and the slot housed portion guide jigs are guiding the coils with portions of the guide jigs formed to extend to the radially inner space of the stator core and the slot housed portion guide jigs overlapping each other as seen in the rotational axis direction.

16. The stator assembly method according to claim 1, further comprising:
inserting the guide jigs into the coils which form the coil assembly after the forming the coil assembly.

17. The stator assembly method according to claim 16, wherein
the inserting the guide jigs into the coils is inserting the guide jigs into the coils from the radially outer side toward the radially inner side of the coil assembly.

18. The stator assembly method according to claim 1, wherein
the forming the coil assembly includes inserting the guide jigs into the coils in a middle of disposing the plurality of the coils in an annular arrangement to form the coil assembly.

19. The stator assembly method according to claim 1, wherein:
wherein the guide jigs are configured so as to keep the separation interval along a substantial length of the edge portions of the teeth that extend in the radial direction when inserting the coils into the slots of the stator core.

20. The stator assembly method according to claim 1, wherein:
wherein the guide jigs are placed so as to keep the separation interval along a substantial length of the edge portions of the teeth that extend in the radial direction when inserting the coils into the slots of the stator core.

21. The stator assembly method according to claim 1, wherein:
wherein the guide jigs are placed along the edge portions of the teeth that extend in the radial direction from a time before the coils are inserted into the slots of the stator core and until the coils are fully inserted into the slots of the stator core.

22. A stator assembly apparatus that mounts coils that have slot housed portions and coil ends formed from a conductor to an annular stator core that includes slots formed between adjacent teeth that extend from a back yoke toward an inner side in a radial direction, comprising:
guide jigs, wherein the guide jigs are configured to insert the slot housed portions of a plurality of the coils, which form the coil assembly disposed in a radially inner space of the stator core, into the slots of the stator core by pushing out the plurality of the coils which form the coil assembly from a radially inner side toward a radially outer side while guiding the coils such that a separation interval between the coils and edge portions of the teeth that extend in the radial direction is kept in a course of the slot housed portions moving in the slots when inserting the coils into the slots of the stator core, wherein:

a width of the guide jigs in a circumferential direction gradually becomes smaller from the radially outer side toward the radially inner side as seen in a rotational axis direction, and the guide jigs are configured to overlap the teeth when viewing a rotational axis direction; and the guide jigs are configured to insert the slot housed portions of the plurality of the coils by inserting the slot housed portions into the slots while the guide jigs are guiding the coils with the guide jigs disposed so as to overlap the teeth when viewing the rotational axis direction.

* * * * *